United States Patent [19]

Albert et al.

[11] Patent Number: 4,946,070
[45] Date of Patent: Aug. 7, 1990

[54] SURGICAL SOAP DISPENSER

[75] Inventors: Stephen B. Albert, Menlo Park; W. Benjamin Thomas, Fremont, both of Calif.

[73] Assignee: Johnson & Johnson Medical, Inc., Arlington, Tex.

[21] Appl. No.: 312,018

[22] Filed: Feb. 16, 1989

[51] Int. Cl.⁵ .............................................. B67D 5/60
[52] U.S. Cl. .................................... 222/52; 222/181; 222/214; 141/351
[58] Field of Search ................. 222/52, 63, 92, 94-95, 222/105, 173, 181, 185, 206, 207, 212, 214, 333, 491, 494, 336; 417/474, 476; 141/98, 351

[56] References Cited

U.S. PATENT DOCUMENTS

| | | | |
|---|---|---|---|
| 2,113,022 | 4/1938 | Hefti | 222/207 |
| 3,881,641 | 5/1975 | Pliml, Jr. et al. | 222/207 |
| 4,147,278 | 4/1979 | Uhlig | 222/94 |
| 4,178,975 | 12/1979 | Crespi | 141/362 |
| 4,271,988 | 6/1981 | Clausen | 222/214 |
| 4,349,133 | 9/1982 | Christine | 222/183 |
| 4,513,885 | 4/1985 | Hogan | 222/95 |
| 4,667,854 | 5/1987 | McDermott | 222/101 |
| 4,715,417 | 12/1987 | Potter et al. | 222/181 |
| 4,722,372 | 2/1988 | Hoffman et al. | 141/98 |

FOREIGN PATENT DOCUMENTS

658907  12/1986  Switzerland ................. 222/214

Primary Examiner—Michael S. Huppert
Attorney, Agent, or Firm—Joseph F. Shirtz

[57] ABSTRACT

An apparatus is disclosed which dispenses a metered quantity of a liquid. The apparatus uses a roller and base pad to form a nip which receives a dispensing leg of a container. Movement of the roller along the base pad causes liquid within the dispensing leg to be dispensed through a pressure responsive valve. The roller travels along a D-shaped path, the straight portion of the path is the nip forming portion. The apparatus operates in response to an object reflecting a beam of electromagnetic energy in the form of infrared light. A container is also disclosed which has a housing, preferably cardboard, and an envelope of flexible plastic contained therein. The envelope holds the liquid and the dispensing leg is accessed through a tear-away opening in the cardboard housing.

15 Claims, 8 Drawing Sheets

SURGICAL SOAP DISPENSER

FIELD OF THE INVENTION

This invention relates to dispensers for liquids and in particular to an automatic metering dispenser for surgical scrubs.

BACKGROUND

It is known in the art to provide a reservoir of liquid material to supply an outlet of such material on demand.

For example, U.S. Pat. No. 2,113,022 discloses a dispensing device which uses a rubber tube to discharge liquid from a container. In operation, a handle is depressed causing a roller to squeeze along the length of the tube ejecting material therein. After dispensing, the roller disengages and permits the tube to refill.

U.S. Pat. No. 4,178,975 discloses a dispensing device which is activated by inserting a member into the device. Upon removing the member, a product (particularly toothpaste for example) is dispensed upon the member (a toothbrush for example). The device has a roller which is mounted at a distal end of an arm. The other end of the arm is pivotally mounted to a slidable head. A parallelogram shaped guide causes the roller to compress a flexible tube between the roller and a housing when the roller moves in one direction and disengages the roller from the tube when the assembly moves in the opposite direction. Thus, inserting the member cocks the mechanism by moving the roller along one side of the parallelogram, while removing the member causes the roller to squeeze product out of the tube by passing along another side of the parallelogram.

U.S. Pat. No. 4,667,854 discloses a dispensing apparatus which has a rotatably mounted arm with a roller at a distal end. The arm rotates in response to a manually applied liner force. The rotation of the arm causes the roller to pass along a flexible tube to force product out of the tube.

U.S. Pat. No. 4,147,278 discloses a dispensing apparatus having a first container disposed around a second container. The second container is flexible and contains product. A source of fluid pressure such as a foot pump, for example, communicates with the space defined between the first and second container. When pressure is applied to the second container by pumping up the space between the two containers, product is dispensed from the second container.

These types of devices, however, prove cumbersome or unacceptable for dispensing surgical scrub solutions. When scrubbing prior to surgery, operating room personnel must limit their contact with nonsterile objects. Therefore, hand operation of a disepnser may cause contamination of hands which have already been substantially scrubbed. Foot pump or foot switch operated dispensers are cumbersome as the operating room personnel must locate the pedal under a sink with their foot and in the case of air pump operated dispensers, contaminated air may be introduced into the soap supply.

SUMMARY OF THE INVENTION

The present invention, however, provides a new dispenser which supplies a metered dose of scrub soap product without user contact of the device or the introduction of air into the soap supply. The device may be adjusted to customize the quantity of soap product.

The devices uses a light beam emitting means to provide a zone into which a hand scrub brush or other article may be inserted to trigger the dispenser. The inserted object, a hand, for example, causes a portion of the beam to be reflected to a receiver which triggers the device to dispense a single metered dose of product.

An adjustable constricting means in the form of a cooperating roller and pad constrict and pass along a flexible dispenser portion causing the product to be extruded from the dispenser portion. A clip at the distal end of the dispenser portion prevents passage of product until sufficient pressure is built up within the dispenser portion to overcome a spring force of the clip.

The clip may be part of a disposable container of product which is placed within the apparatus. Once emptied, the disposable container with its clip are discarded and a new container and clip assembly are inserted. Alternatively, the clip may be part of the device. In this fashion, the clip may be made of two parts which sandwich a portion of the product container to seal one end. One or both of the clip parts may be spring biased to provide the appropriate closing force. Advantageously, the housing of the device may have a hinged cover and main body portion. One clip part may be mounted on the body portion and the second on the cover to cooperate with the first part upon closing the cover. In this way a container of product having a sealed end to its dispensing portion may be inserted into the apparatus. Upon closing the lid, the clip is actuated and the sealed end of the container may be torn or cut off.

DETAILED DESCRIPTION OF THE PREFERRED EMBODIMENTS

Figure 1:
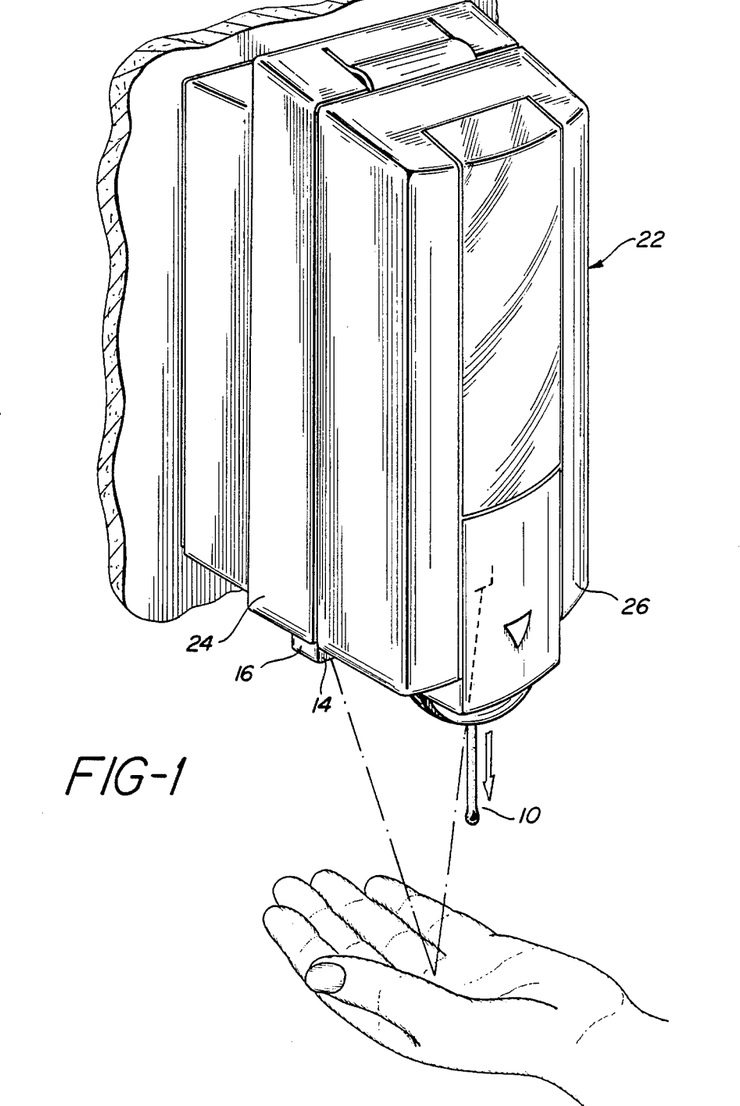
FIG. 1 is a perspective view of the dispensing apparatus of the present invention shown in operation.
Figure 2:
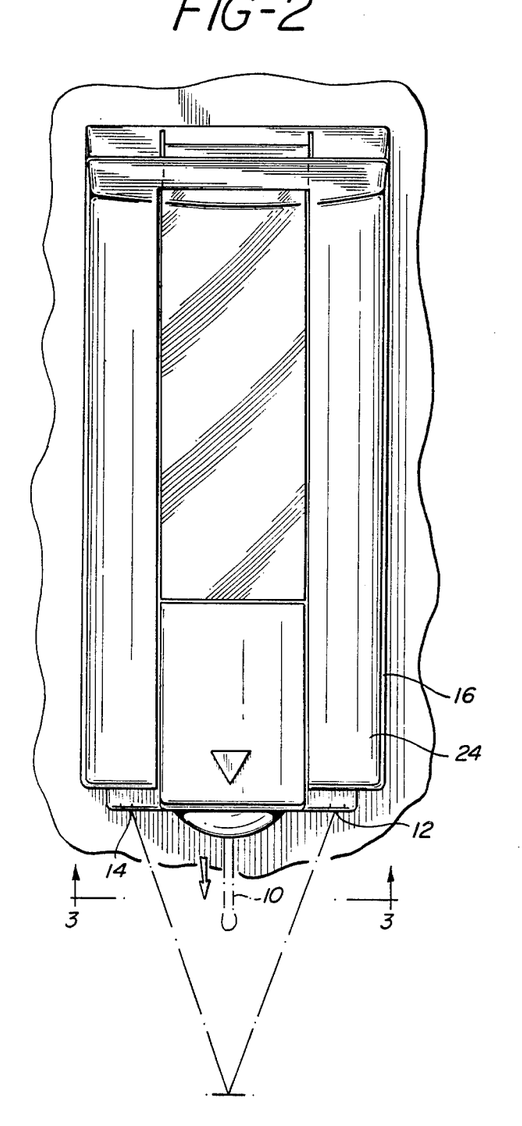
FIG. 2 is a front elevational view of the apparatus in FIG. 1.
Figure 3:
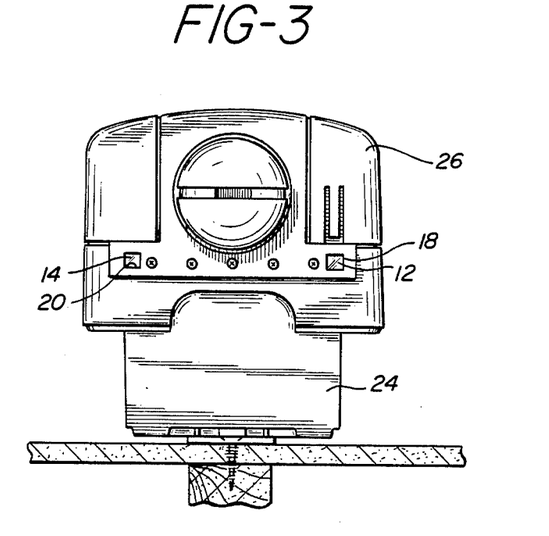
FIG. 3 is a bottom view of the apparatus of the invention.
Figure 4:
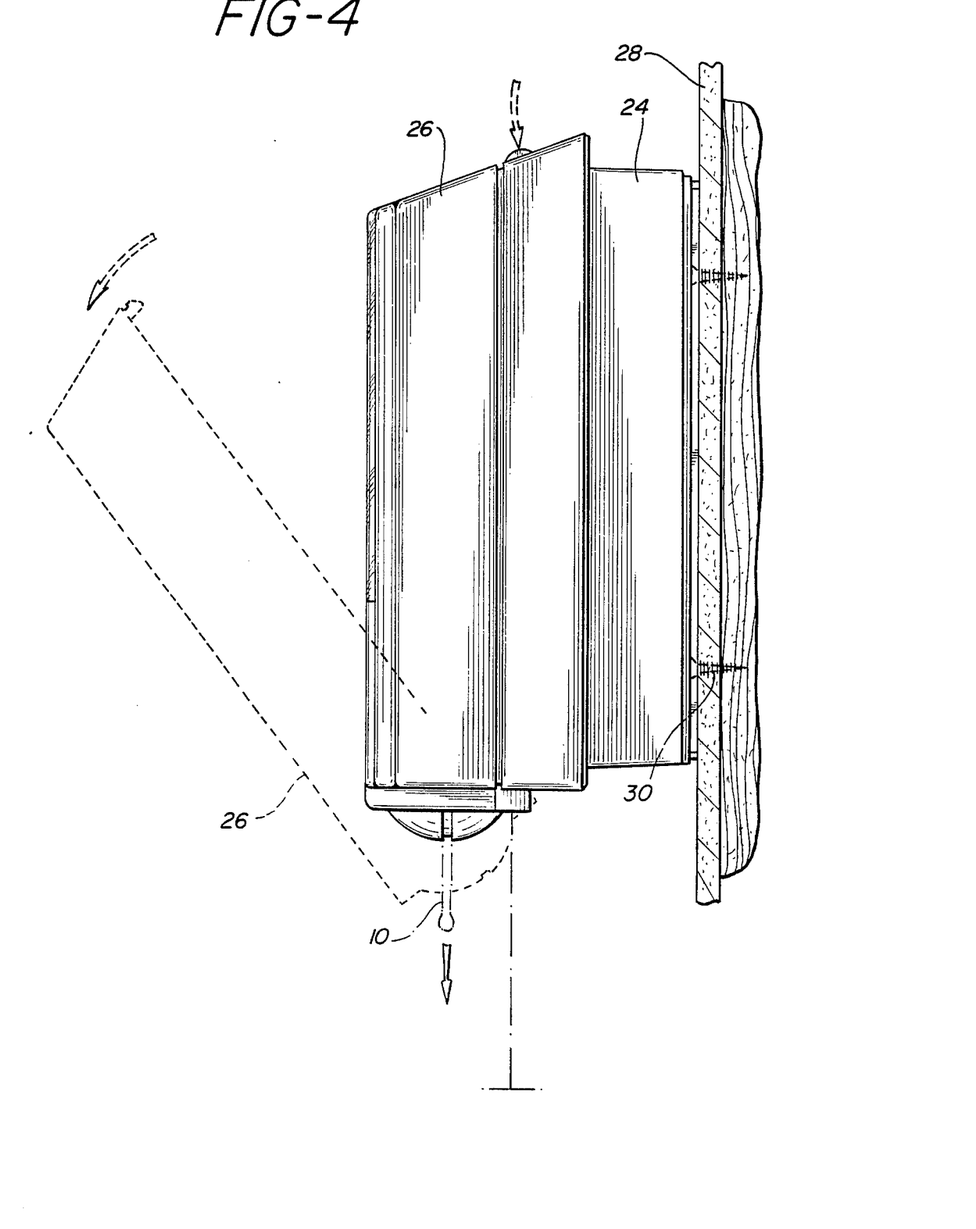
FIG. 4 is a side view of the apparatus of the invention.

An overall view of the device in operation is depicted in FIGS. 1 and 2. The liquid soap 10 exits the bottom of the device in response to an object (the hand) placed into a triggering field. The field is established by the cooperation of light emitting diode (LED) 12 and light sensor 14. LED 12 emits light in the infrared range at angle from the bottom of housing 16 through a diode opening 18. Spaced from diode opening 18 is sensor opening 20. Light from the LED passes from the bottom and is reflected through sensor opening 20 by the hand. The sensor detects the reflected light and turns on the pumping mechanism (described below) for a single dispensing of a predetermined quantity of soap. When an object is not present, light from LED 12 is not reflected to the sensor but rather dissipates out into the background. The position and size of the triggering field, that is the zone in which the presence of a reflecting object will trigger operation, is determined by the separation of LED 12 and sensor 14, the intensity of the energy coming from LED 12 and the angle of the incidence of the LED 12. Clearly, a more downwardly directed beam will lower the triggering field while moving the beam direction toward horizontal will raise the triggering field position. Furthermore, a more intense energy stream from the LED will be reflectable in sufficient amount to trigger the sensor from a greater distance.

Housing 22 has a base 24 and a hingeably mounted cover 26. The base 24 mounts to a wall 28 through fastening members 30. Alternatively, the base 24 may be mounted on a movable item such as a roller stand, for example.

Figure 5:
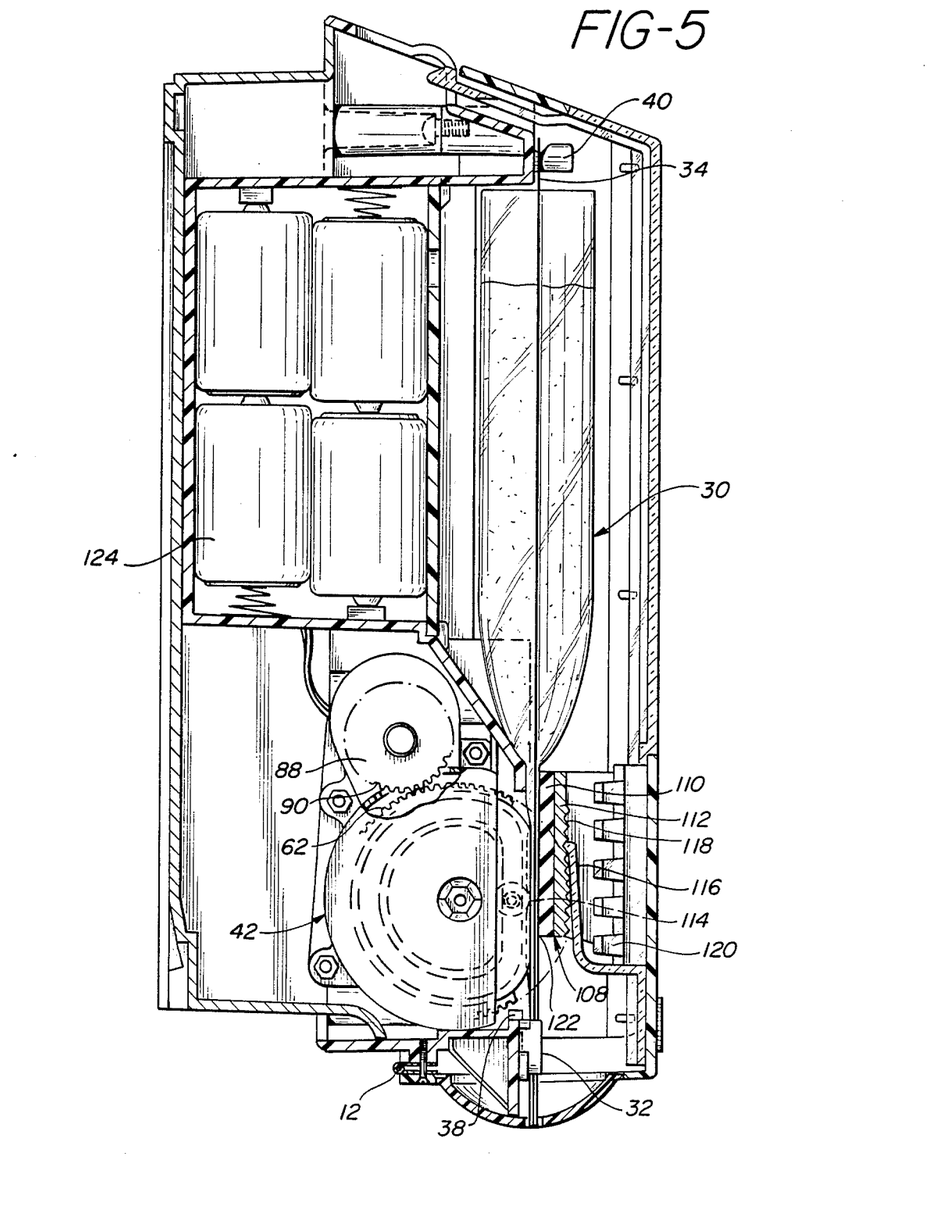
FIG. 5 is a side cross-sectional view of the apparatus of the invention.

Referring now to FIG. 5, the internal structure of the device will be described. A product container 30 is received within the housing 22. Container 30 has a clip 32 and a header 34 which defines a pair of openings 36. The clip 32 is received beneath a flange 38 and header 34 is suspended from posts 40 which extend through openings 36. Thus, container 30 is placed in proper registered position for operation of the device.

Figure 6:
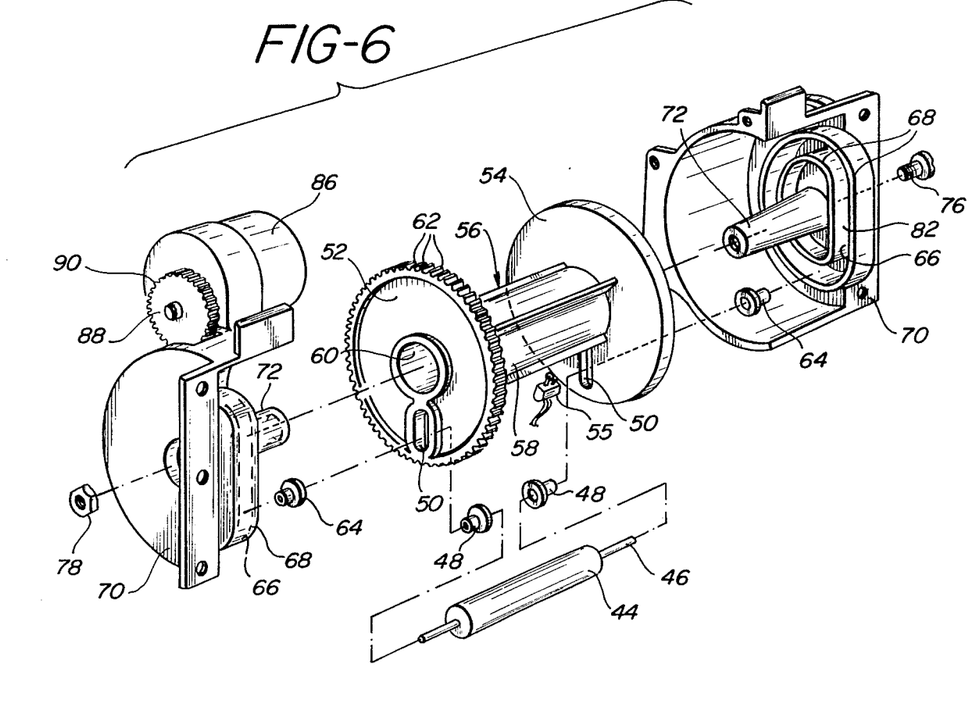
FIG. 6 is an exploded view of the pumping mechanism.
Figure 7:
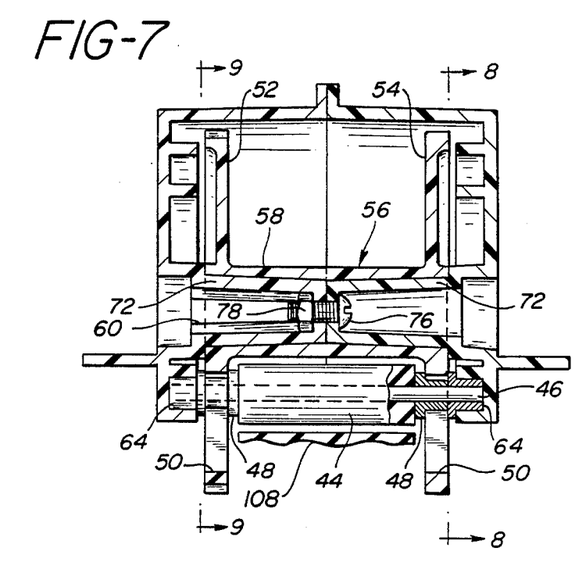
FIG. 7 is a partial cross-sectional view of the pumping mechanism.

The pumping mechanism 42 is shown in FIG. 6. The roller 44 is rotatably mounted on a shaft 46. Shaft 46 is received within a pair of slide bushings 48. Slide bushings 48 are in turn received in a pair of parallel slots 50 which are defined in end flanges 52,54 of carrying spool 56. Slots 50 are defined to have their longitudinal direction extending radially of their respective end flanges 52,54.

Carrying spool 56 has a central body portion 58 which supports and separates the end flanges 52,54. Body portion 58 defines a central bore 60 which extends through body portion 58. One of the flanges 52 has radially extending teeth 62. The other of the flanges has a cam shape which cooperates with switch 55 to signal when a full operational cycle is complete. Carrying spool 56 is mounted for rotation about its longitudinal axis and is rotated by a force transmitted to teeth 62.

Shaft 46 also carries a pair of raceway bushings 64. The raceway bushings define a bore which receives shaft 46. Raceway bushings 64 are in turn received within a "D" shaped raceway 66 defined by a pair of walls 68 in each of a pair of end covers 70. End covers 70 each have a post 72 extending therefrom at the center of the "D". These posts 72 are inserted into central bore 60 during assembly and thereby form an axle on which spool 56 may rotate. Advantageously, these posts 72 may define aligned openings 74 through which a fastener such as bolt 76 may pass.

To assemble the unit, the slide bushings 48 are positioned within their respective slot 50 and the roller 44 is aligned therebetween. The shaft 46 is inserted through the slide bushings and roller. The raceway bushings 64 are then placed on the ends of shaft 46 which extend from slide bushings 48. The end covers are then joined in an aligned fashion with both posts 72 of the covers meeting end to end within central bore 60. The raceway bushings 64 are at this time positioned within the "D" shaped raceways of the respective cover. Bolt 76 is inserted through the openings at the end of the posts and receives a nut 78 thereupon which holds the two covers together. Thus, the spool 56 is rotatably mounted on an axle formed by posts 72.

Figure 8:
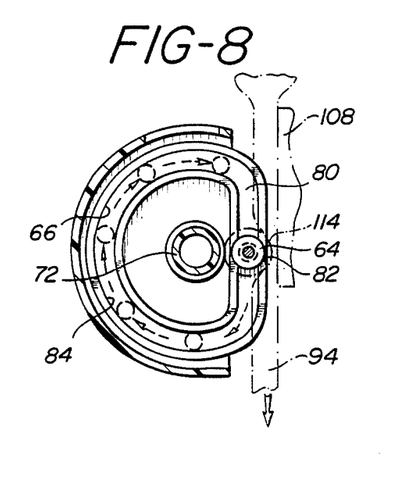
FIG. 8 is a partial cross-section of the apparatus showing the pumping mechanism during operation.
Figure 9:
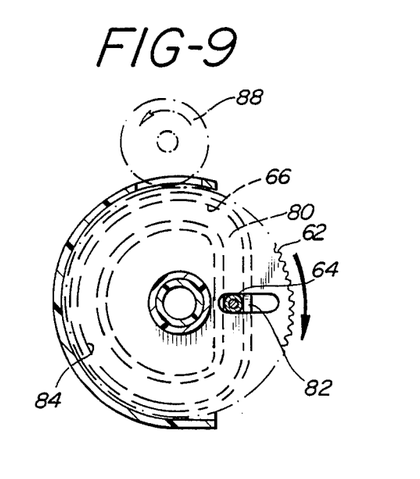
FIG. 9 is a partial cross-section of the pumping mechanism during operation shown in FIG. 8.

Once assembled, the roller's movement is constrained by two elements: slots 50 and raceways 66. Referring now to FIGS. 8 and 9, the motion of the roller will be described. At the beginning of a cycle the roller is in a home position positioned slightly spaced from straight portion 80 of raceway 66 (FIG. 8). Twisting the spool in a clockwise direction as shown in FIG. 8 will cause the roller to move down the straight portion 80. This causes the roller to move inward along slots 50 as the roller moves down straight portion 80. At midpoint 82, the roller is at its closest point to the center axis of the spool (FIG. 9). Further twisting of the spool moves the roller down straight portion 80 and radially outward along slots 50. Once at the bottom of straight portion 80, the roller is at its radially outermost position in slots 50. The roller then moves in a circular path along arc portion 84 of raceway 66. The cycle is complete when the roller reaches its home position away from the straight portion.

In order to drive the spool 56 through its cycle, a DC motor 86 is provided. The DC motor is mounted with its axis of rotation parallel to the axis of rotation of spool 56. A pinion 88 is mounted on the drive shaft of the DC motor. The pinion has radially extending teeth 90 which intermesh with teeth 62. When the DC motor operates, it drives pinion 88 and thereby rotates spool 56 through teeth 90 and 62. The DC motor only operates through a predetermined number of rotations of pinion 88, then stops. By appropriate controls and sizing of spool 56 and pinion 88, the DC motor operates to rotate the spool one turn and stops. Continued presence of an object in the triggering zone will not initiate another operation of the DC motor. Once initiated, the DC motor operates to move the spool one rotation whether the object remains in the triggering zone or is removed. In order to initiate another cycle, the object must be removed from the triggering zone and then reinserted thus controlling the dispensing operation and preventing accidental second dispensing.

Figure 10:
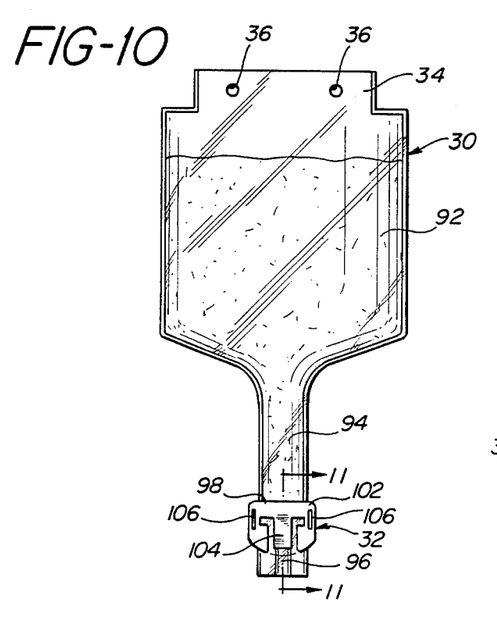
FIG. 10 is a front elevation of the flexible container for the product to be dispensed.
Figure 11:
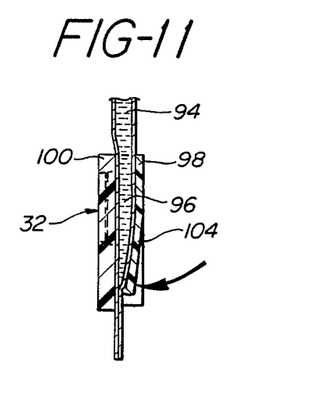
FIG. 11 is a cross-sectional view of the flow control clip of the container of FIG. 10.

In FIGS. 10 and 11, the structure of the container of the inention is shown. The container 30 is formed of two sheets of flexible plastic material, sealed about their perimeter to form an envelope for holding product. The sheets form a header 34 which defines a pair of openings 36. The container 30 has a main body 92 and a depending outlet leg 94. Body 92 acts as a reservoir for the product being dispensed. Leg 94 cooperates with the pump mechanism to dispense product as will be described below. The plastic sheets are sealed at the lower terminus of leg 94 to form a constricted conduit 96. The open width of conduit 96 is narrower than the open width of the remainder of leg 94.

Figure 12:
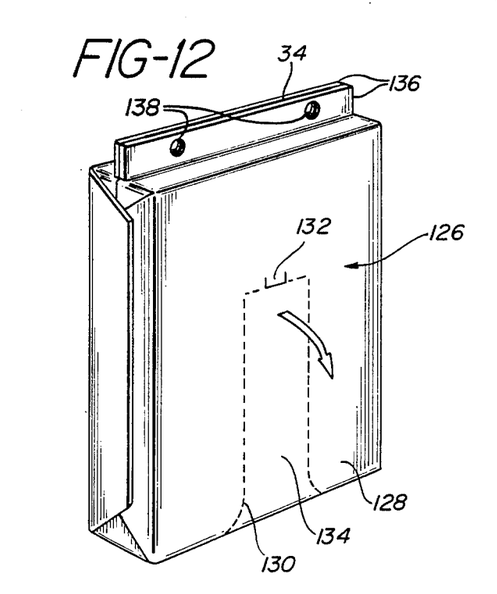
FIG. 12 is a perspective view of an alternative embodiment of the container.
Figure 13:
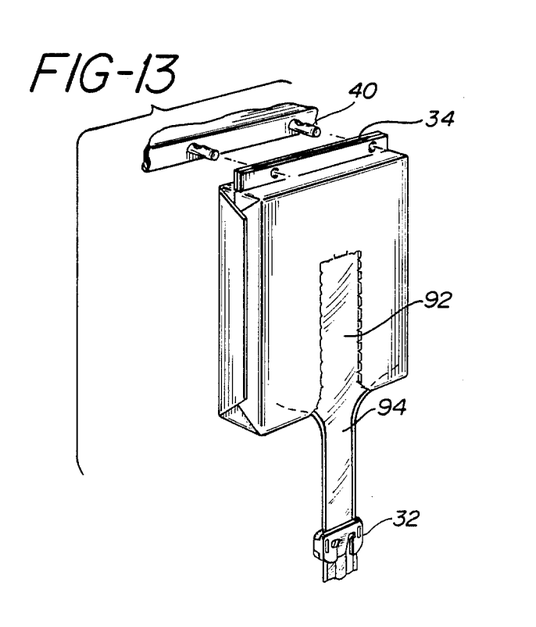
FIG. 13 is a perspective view of the mounting of the container of FIG. 12.

FIGS. 12 and 13 show an alternative embodiment of the container. A box 126 of cardboard or similar material is formed about the container. Leg 94 is folded upward adjacent main body 92. The wall 128 of box 126 is perforated along a path 130 which outlines the position of leg 94 within the box 126. A small slit 132 is provided to permit insertion of an object, such as a finger, into the box behind the section 134 outlined by path 130. Section 134 may thereby be pulled outwardly to separate section 134 from the remainder of box 126 along path 130. Leg 94 is then removed from the box and assumes its depending position (FIG. 13). The box has flanges 136 which sandwich header 54. Flanges 136 define openings 138 which are aligned with openings 36 of header 34. In this manner the entire box may be mounted within the dispenser and an axial opening is defined in the box, by the removal of section 134, to permit visual determination of the level of soap within the container.

Conduit 96 is closed by clip 32 (FIGS. 10 and 11). Clip 32 is formed of a forward tongued half 98 and a rearward base half 100. Tongued half 98 has a body 102 and an extending resilient tongue 104. Tongue 104 has an inturned lip 106 which is biased against the container by the resiliency of tongue 104. Tongued half 98 and base half 100 are attached via a one-time snap 106 in such a manner as to capture a portion of leg 94 therebetween. Base half 100 acts as a seat for lip 106 so the conduit 96 is pinched closed therebetween. A build-up of pressure in leg 94 sufficient to overcome the biasing force of tongue 104 will force the lip 106 and base half 100 to separate permitting passage of product. Once the pressure decreases below that necessary to open the clip, the clip will pinch conduit 96 closed to prevent leakage.

In order to provide the increased pressure to overcome the pinching force of clip 32, the pumping mechanism cooperates with a pad 108. Pad 108 (FIG. 5) has a resilient elastomeric surface 110 and a support 112. The pad 108 is positioned adjacent roller 44 forming a nip 114 therewith. The leg 94 is captured within nip 114 such that movement of roller 44 downward along pad 108 forces product within leg 94 downward toward clip 32. Once the force of the roller pushing the product downward increases the pressure sufficiently, the clip 32 opens and product is dispensed as described above. The roller 44 continues downward along the pad 108, thereby a quantity of product is dispensed.

The quantity of product dispensed is adjustable. Pad 108 is slidably mounted to the housing. A resilient tang 116 engages a series of ribs 118 on the back of support 112. The pad 108 has feet which engage a pair of opposed channels 120 to hold the pad in position. Thus, the outward pressure of tang 116 on the support causes the feet to engage on wall of channel 120 fixing the pad's horizontal position. The engagement of tang 116 with ribs 118 fixes the pads vertical position. By adjusting the vertical position of pad 108, the length that roller 44 travels while forming nip 114 is adjusted. The cross-sectional area of leg 94 is known, therefor the volume dispensed is determined by the length of leg 94 along which nip 114 acts. By raising pad 108, the roller will reach the end 122 of the pad 108 sooner, thereby dispensing a smaller quantity of product than if the pad was lower to provide a greater length of nip travel.

The device is driven by a power source such as batteries 124. The power source runs the LED and drives the DC motor. Appropriate controls such as interaction between cammed flange 54 and switch 55 are used to rotate the DC motor only enough times to drive the roller 44 a single pass about the raceway. At the completion of the cycle, switch 55 is activated to shut off the DC motor. If the sensor still picks up reflection from an object in the triggering zone when the roller completes its pass, it will not initiate another pass. The roller always completes a full pass prior to shutting down the DC motor, thus the quantity dispensed is consistent as each operation uses one complete pass of the roller.

We claim:

1. A device for dispensing a predetermined quantity of a liquid product comprising:
   (a) a roller mounted for rotation and movable along an endless path which is substantially straight along a first portion of said path;
   (b) a base pad adjacent said path along said first portion of said path and defining a nip with said roller as it travels along at least part of said first portion;
   (c) a flexible walled conduit means positioned adjacent said base pad within said nip;
   (d) a valve means biased in a normally closed position sealing said conduit, said valve means being openable in response to increased pressure within the conduit means and recloses upon reduction of said pressure increase below a predetermined level;
   (e) an amount of said liquid product within said conduit between said nip and said valve means; and
   (f) moving means for moving said roller along said first portion of said path toward said valve means to squeeze said product between said nip and said valve means to increase the pressure within said conduit to open said valve means and permit passage of said product past said valve means out of said conduit, said moving means including a pair of spaced parallel rotatable walls each defining a slot extending radially from a center of rotation of one wall, said slots supporting said roller, and biasing means for biasing said roller along said slots into a position forming said nip.

2. The device according to claim 1 wherein:
   (a) at least one of said spaced walls is rotated about said center of rotation by a drive element engaging a periphery of said wall.

3. The device according to claim 2 wherein:
   (a) each wall rotates about an axis co-axial with the other wall.

4. The device according to claim 3 wherein:
   (a) said walls are rigidly connected to one another.

5. The device according to claim 1 wherein:
   (a) said biasing means comprises:
      (i) at least one guide track on a side opposite one of said walls from said roller; and
      (ii) a bushing engaging said guide track and fixed to said roller to move said roller within said slots in response to the position of said guide track as said walls are rotated.

6. The device according to claim 5 wherein:
   (a) said guide track is continuous.

7. The device according to claim 6 wherein:
   (a) said guide track is defined by a pair of spaced parallel walls parallel to the axis of rotation of the roller and a connecting web forming a U-shaped channel.

8. The device according to claim 7 wherein:
   (a) said guide track extends along a substantially straight path along a first portion and extends along an arcuate path along a second portion.

9. The device according to claim 8 wherein:
   (a) the guide track has a substantially D-shaped path in a plane transverse to the axis of rotation of the roller.

10. The device according to claim 9 wherein:
    (a) there are two complimentary guide tracks, a first on a side opposite from the roller of one wall and second on a side opposite from the roller of the other wall, and two bushings, one of said bushings engaging one of said guide tracks and the other of said bushings engaging the other of said guide tracks.

11. The device according to claim 10 wherein:
(a) said guide tracks extend from a surface of a housing containing said walls and roller.

12. The device according to claim 1 further including:
(a) an electromagnetic energy emitter emitting energy beneath said dispenser, which energy is reflectable by objects in its path; and (b) a detector for detecting a portion of such energy reflected by objects in the path of said energy.

13. The device according to claim 12 wherein:
(a) said electromagnetic energy is in the range of infrared light.

14. The device according to claim 13 wherein:
(a) said moving means comprises an electric motor.

15. The device according to claim 14 wherein:
(a) control means energize said electric motor upon said sensor detecting reflected energy for sufficient time to rotate said pair of spaced walls one rotation.

* * * * *